March 29, 1955 W. H. CUTTINO 2,705,300
AUTOMATIC SWITCHING APPARATUS FOR VOLTAGE REGULATION
Filed Feb. 8, 1954
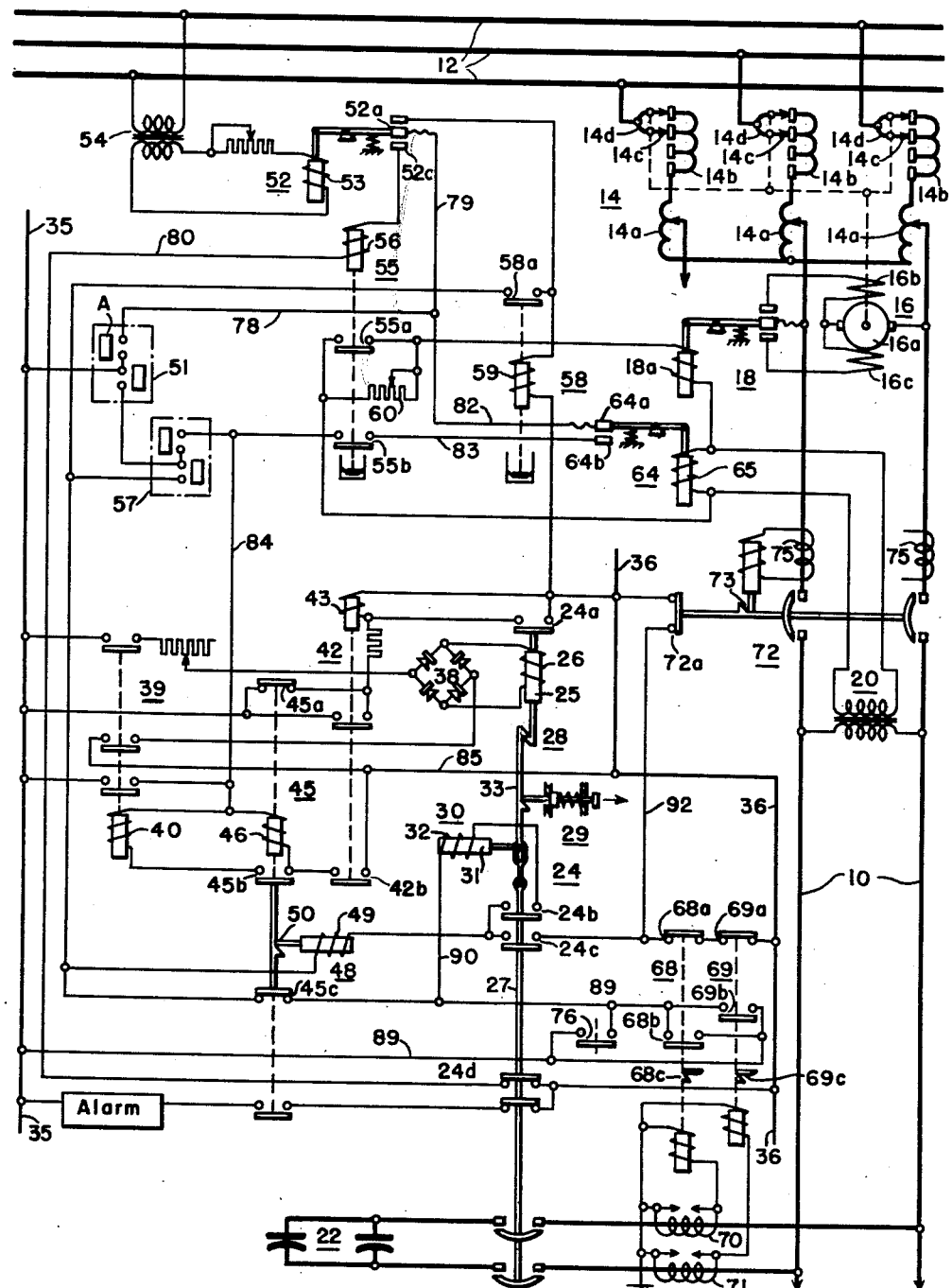
WITNESSES:
Wm. B. Sellers.
G. V. Giolma
INVENTOR
William H. Cuttino.
BY
Ralph H Swingle
ATTORNEY

United States Patent Office 2,705,300
Patented Mar. 29, 1955

2,705,300

AUTOMATIC SWITCHING APPARATUS FOR VOLTAGE REGULATION

William H. Cuttino, Pittsburgh, Pa., assignor to Westinghouse Electric Corporation, East Pittsburgh, Pa., a corporation of Pennsylvania Application February 8, 1954, Serial No. 408,820

10 Claims. (Cl. 323—43.5)

My invention relates generally to automatic switching apparatus, and it has reference, in particular, to automatic switching apparatus for capacitors.

Generally stated, it is an object of my invention to provide for automatically switching capacitors on a circuit which is provided with a voltage regulator.

More specifically, it is an object of my invention to provide for switching capacitors on the load side of a voltage regulator in response to variations in voltage on the source side of the regulator.

Yet another object of my invention is to provide for switching a capacitor on the load side of a voltage regulator in response to variations in voltage on the source side of the regulator, and for operating the regulator to reduce the voltage on the load side prior to connection of the capacitor.

It is also an object of my invention to provide for operating a switch to control the connection of a capacitor to a circuit for regulating the voltage thereof and for preventing opening of the switch in response to a fault condition until the circuit is disconnected from the source.

It is an important object of my invention to provide for connecting a capacitor to a circuit on the load side of a tap-changing voltage regulator in response to variations in the voltage on the source side of the regulator and for changing the response of the regulator to reduce the voltage for which it regulates, prior to such connection.

Other objects will, in part, be obvious and will, in part, be explained hereinafter.

In practicing my invention in accordance with one of its embodiments, a switch is arranged to connect a bank of capacitors to a feeder circuit on the load side of a tap-changing voltage-regulating transformer. The regulation of the transformer is controlled by a voltage relay responsive to the voltage of the feeder circuit. An additional voltage relay on the source side of the transformer controls operation of the switch for connecting the capacitors when the voltage on the source side drops to a predetermined value. This additional voltage relay also changes the voltage applied to the regulator voltage relay so as to cause the regulator to reduce the voltage of the load circuit by an amount approximating the increase produced by the connection of the capacitors just prior to connection of the capacitors.

For a more complete understanding of the nature and scope of my invention, reference may be made to the following detailed description, which may be read in connection with the accompanying drawing in which the single figure is a schematic diagram of a regulating system embodying the invention in one of its forms.

Referring to the drawing, the reference numeral 10 may denote the conductors of a 4.8 kilovolt feeder or load circuit which may be connected to a 33 kilovolt power distribution circuit, designated by the numeral 12, through a tap changing voltage regulator transformer 14. The power distribution circuit 12 may extend from a source (not shown) located, for example, to the left of the drawing, and may extend past the transformer 14 to supply other feeder circuits and their associated loads similar to the feeder circuit 10.

The tap changing transformer 14 may be of any suitable type and is shown, in this instance, as comprising an autotransformer having main windings 14a which are connected to the power circuit through tapper winding portions 14b having adjustable connections made thereto through movable contacts 14c and preventative autotransformers 14d in a manner well known in the art. Operation of the movable contacts 14c may be effected by means of a motor 16 having an armature 16a and oppositely disposed field windings 16b and 16c disposed to be selectively energized through a voltage regulating relay 18 having an operating winding 18a disposed to be energized from the feeder circuit 10 through a potential transformer 20 on the load side of the transformer 14 for the purpose of normally maintaining a substantially constant value of voltage on the feeder circuit.

In order to improve the regulation of the feeder circuit 10, a bank of capacitors 22 may be connected to the circuit through a switch 24, which is herein illustrated as being of the trip-free type, having an armature 25 disposed to be actuated by an operating winding 26 for operating a contact rod 27 through releasable latch means 28. A manually releasable latch 29 is provided for holding the switch in the closed position and trip means 30, including an armature 31 and a trip winding 32, may be provided for actuating a portion 33 of the operating mechanism to release the latch means 28 and permit the contacts to open. Energization of the operating winding 26 may be effected by connecting the winding between the conductors 35 and 36 of a control source through a rectifier bridge circuit 38 by means of a closing relay 39 having an operating winding 40. A cut-off relay 42 having an operating winding 43 may be provided for effecting deenergization of the operating winding 40 of the closing relay in response to closing of the switch. A lock-out relay 45 having an operating winding 46 whose energization is controlled by the closing relay and reset means 48, including a reset winding 49 for releasing a latch mechanism 50 which holds the relay 45 in the closed position, may be provided for controlling operation of the closing relay 39.

Operation of the switch 24 may be controlled automatically in response to the voltage of the power circuit 12 by means of a voltage relay 52 having an operating winding 53 connected to the power circuit through a potential transformer 54. A manual-automatic switch 51 provides for selectively connecting the relay 52 for operating the switch 24, or for connecting the switch to a manual operating switch 57. A time delay relay 55 having an operating winding 56 may be interposed between the voltage relay and the closing relay 39 for preventing operation thereof in response to transient voltage conditions. A time delay relay 58 having an operating winding 59 may be provided for effecting delayed disconnection of the capacitors in response to increase in the voltage of the power circuit.

In order to prevent raising the voltage of the distribution circuit above a desired value during switching of the capacitors, time delay relay 55 may be arranged to shunt a resistor 60 normally connected in circuit with the winding 18a of the voltage relay 18 so as to change the response level of the relay and cause the regulating transformer 14 to reduce the voltage of the distribution circuit by an amount slightly less than the increase which will be produced by the connection of the capacitors thereto, just prior to such connection. An additional voltage relay 64 having an operating winding 65 may be provided for completing the operating circuit between the time delay relay 55 and the lock-out relay 45 when the voltage of the distribution circuit has been reduced by the regulating transformer 14 to such value.

Overcurrent relays 68 and 69 may be connected in circuit with current transformers 70 and 71 in circuit relation with the capacitor 22 and the distribution circuit. Instead of directly effecting operation of the switch 24 to disconnect the capacitors from the distribution circuit in the event of a fault, the relays 68 and 69 may be used, having latches 68c and 69c for holding them in the operated position, to set up a tripping circuit for the switch, which circuit must be completed through a back contact 72a of the circuit breaker 72 which connects the feeder circuit 10 to the regulating transformer 14. This circuit breaker is provided with a trip means 73 energized from a suitable current transformer 75. Such a circuit breaker will have adequate capacity to interrupt even the most severe fault conditions and this permits the switch 24 to be used merely as a switching device for interrupting only the normal current of the capacitors. Other protective relays such as for example, an excess temperature relay represented by contact 76 may be connected in parallel with the overcurrent relays.

In normal operation the circuit breaker 72 will be in the closed position. Variations in the voltage of the feeder circuit 10 will operate the voltage relay 18 to control the regulator motor 16, causes it to move the adjustable contacts 14c of the regulator to maintain a substantially constant value of voltage on the feeder circuit.

Should the voltage of the power distribution circuit 12 be reduced either through the application of a relatively heavy load to the feeder circuit 10 or through increased loading due to the application of additional loads on other such feeder circuits, the voltage relay 52 will close its contacts, providing an energizing circuit for the time delay relay 55, extending from conductor 35 through the automatic contact A of switch 51, conductor 78, conductor 79, moving contact 52a, stationary contact 52c, operating winding 56, conductor 80, contact member 24d to conductor 36. After a predetermined time, delay relay 55 operates and provides a shunt circuit through contact member 55a about resistor 60, thus increasing the effective voltage applied to the voltage relay 18 from the circuit 10, causing the regulator 14 to reduce the voltage of the feeder circuit. When the voltage of this circuit reaches a predetermined value which is slightly less than the voltage effect of the capacitors below normal voltage, relay 64 operates and provides an energizing circuit for the operating winding 46 of the lock-out relay extending from conductor 35 through the automatic-manual control switch 51, conductor 78, conductor 82, contacts 64a and 64b of voltage relay 64, conductor 83, contact member 55b, conductor 84, operating winding 46, contact member 42b and conductor 85 to conductor 36. The lock-out relay operates and is latched in the operating position by the latch 50. A circuit is provided through contact member 45b for the operating winding 40 of the closing relay 39. A contact member 45a interrupts the original energizing circuit for the cut-off relay 42. Operation of closing relay 39 provides an energizing circuit for the operating winding 26 to effect closing of the switch 24. Contact 24a shunts the operating winding 43 of the cut-off relay 42, which interrupts the energizing circuit of the closing relay and lock-out relay at contact 42b. The energizing circuit for the time delay relay 55 is thereupon interrupted at contact member 24d so that relay 55 returns to the deenergized position removing the shunt from resistor 60, whereupon a voltage relay 18 is free to operate the tap-changing regulator 14 to further regulate the voltage of the feeder circuit 10.

Should the voltage of the power distribution circuit rise to a value such that the regulator will not be able to regulate for the predetermined normal value of voltage, voltage relay 52 will close its upper contacts and provide an energizing circuit for time delay relay 58. After a predetermined time delay this relay closes contact member 58a and provides an energizing circuit for the reset winding 49 of the lock-out relay 45, releasing the latch member 50 to return the relay to the deenergized position as shown. An energizing circuit is thereupon provided through contact member 45c for the trip winding 32 of the switch 24. Armature 31 is thereupon actuated to the left, releasing the latch means 28 and causing the switch 24 to open and disconnect the capacitors 22 from the distribution circuit. The voltage relay 18 will thereupon be in a position to further regulate the voltage of the distribution circuit to maintain the desired value.

Should a fault occur on the capacitors 22, the over-current relays 68 and 69 will operate and be latched in the operated position to set up an energizing circuit for trip winding 32 of the switch 24. Since contacts 68a and 69a are now open, this energizing circuit extends from the conductor 35 through conductor 88 and either contact member 68b or 69b, conductor 89, conductor 90, trip winding 32, contact member 24b, contact member 24c, conductor 92 and contact member 72a of the circuit breaker 72. This circuit cannot therefore be completed so long as the circuit breaker 72 is closed. The fault must first effect operation of the trip means 73 to release the circuit breaker 72 whereupon the energizing circuit for the trip winding 32 may be completed through contact member 72a. This prevents the switch 24, which is designed to have sufficient capacity for switching purposes, only from attempting to interrupt excessively heavy fault currents. When the capacitors are disconnected in this manner the lock-out relay 45 will not be reset. Accordingly, the switch 24 cannot be automatically closed through operation of the voltage relay 52. The lock-out relay must first be reset manually after an inspection to determine why the switch was opened.

Should an excess temperature occur on the capacitors, contact 76 closes, setting up a trip circuit for trip winding 32 through contacts 68a and 69a. Since the reset winding 49 of the lock-out relay 45 is not energized, the relay 45 must be reset manually before the switch can be closed.

From the above description and the accompanying drawing it will be apparent that I have provided a simple and effective manner for controlling the connection of capacitors to distribution or load circuits provided with automatic regulators. The regulation of the system may be greatly improved and extended over a wider range without any fear of undesirable peak value voltages during switching operations. A switching system embodying the features of my invention requires a minimum of additional equipment, and provides a system which is inexpensive to install and is reliable in operation.

Since certain changes may be made in the above-described construction, and different embodiments of the invention may be made without departing from the spirit and scope thereof, it is intended that all matter contained in the above description and shown in the accompanying drawing shall be interpreted as illustrative and not in a limiting sense.

I claim as my invention:

1. Regulating apparatus comprising, a regulator for varying the voltage of a load circuit relative to that of a source, means responsive to the voltage of the load circuit for effecting operation of the regulator, a capacitor, a switch operable to effect connection of the capacitor to the load circuit, means responsive to the voltage on the source side of the regulator for effecting operation of the switch, and circuit means operable under the control of the second mentioned voltage responsive means for modifying operation of the first-mentioned voltage responsive means.

2. Regulating apparatus comprising, a regulator operable to vary the voltage of a load circuit relative to that of a source, a relay responsive to the voltage of the load circuit for effecting operation of the regulator, a capacitor, a switch operable to connect the capacitor to the load circuit, a relay responsive to the voltage on the source side of the regulator for effecting operation of the switch, and circuit means connecting the relays for increasing the effective voltage applied to the one from the load circuit when the other operates.

3. Regulating apparatus comprising, a transformer for supplying a feeder circuit at a reduced voltage from a high voltage circuit, a regulator for varying the voltage of the feeder circuit relative to the high voltage circuit, a voltage relay responsive to the voltage of the feeder circuit for operating the regulator to maintain a substantially constant voltage on the feeder circuit, a capacitor, a switch operable to connect the capacitor to the feeder circuit, and a voltage relay responsive to the voltage of the high voltage circuit for effecting operation of the switch and increasing the voltage applied to the voltage relay from the feeder circuit.

4. Regulating apparatus for a load circuit disposed to be connected to a high voltage distribution circuit by a tap changing transformer having a control relay therefor responsive to the voltage of the load circuit comprising, a capacitor, a switch operable to connect the capacitor to the load circuit, and a voltage relay for effecting operation of the switch and increasing the voltage applied to the control relay from the load circuit.

5. In regulating apparatus for a load circuit connected to a high voltage distribution circuit by a tap changing transformer having a voltage relay responsive to the voltage of the load circuit for effecting operation of the tap changer to maintain a substantially constant load voltage, a capacitor, a switch operable to connect the capacitor to the load circuit, a voltage relay responsive to the voltage of the high voltage circuit, a resistor connected in circuit with the voltage relay and the load circuit, and circuit means including contacts of the voltage relay on the high voltage circuit for effecting operation of the switch and shunting said resistor.

6. Regulating apparatus comprising, transformer and regulating means for effecting varied energization of a load circuit at a reduced voltage from a high voltage circuit, a voltage relay connected to the load circuit for effecting operation of the regulating means to maintain a substantially constant voltage on the load circuit, a capacitor, a switch operable to connect the capacitor to the load circuit to raise the voltage thereof, a voltage relay connected to the high voltage circuit, a resistor connected in series with the voltage relay of the load circuit, and circuit means controlled by the voltage relay of the high voltage circuit for effecting operation of the switch and shunting said resistor.

7. Regulating apparatus for a load circuit connected to a high voltage circuit by transformer and regulating means having a voltage relay connected to the load circuit for operating said means to maintain a substantially constant value of reduced voltage comprising, a capacitor, a switch operable to connect the capacitor to the load circuit, a circuit breaker connected in the load circuit intermediate the switch and the transformer and regulating means having overcurrent trip means, trip means for the switch, overcurrent means connected between the capacitor and the load circuit, a voltage relay connected to the high voltage circuit for operating said means, and a circuit connecting the trip means for the switch to the overcurrent means between the capacitor and the load circuit including a contact which is open when the load circuit breaker is closed.

8. Regulating apparatus comprising, a regulating transformer for producing a variable reduced voltage from a high voltage circuit, a feeder circuit breaker connecting a load circuit to the regulating transformer, overcurrent means for tripping said breaker, a capacitor, a switch operable to connect the capacitor to the load circuit, overcurrent means in circuit with the capacitor, trip means for the switch, a voltage relay responsive to the voltage of the high voltage circuit operable to selectively operate the switch and the trip means therefor, and circuit means connecting the trip means and the capacitor overcurrent means only when the feeder circuit breaker is open.

9. Regulating apparatus for a feeder circuit connected to a high voltage circuit by a tap changing transformer having a voltage relay responsive to the voltage of the feeder circuit for maintaining a substantially constant normal voltage thereon comprising, a capacitor, a switch operable to connect the capacitor to the feeder circuit to increase the voltage thereof, a voltage relay responsive to the voltage of the high voltage circuit, circuit means controlled by said last-mentioned voltage relay for raising the effective voltage applied to the first-mentioned voltage relay from the feeder circuit, an additional voltage relay operable in response to a reduction of the voltage of the feeder circuit to a value below normal by an amount slightly less than the increase caused by connection of the capacitor thereto to effect closing of the switch, and circuit means responsive to closing of the switch for interrupting the aforesaid circuit means.

10. Automatic switching apparatus for controlling the connection of a capacitor to the load slide of a feeder voltage regulator comprising, a switch for connecting the capacitor to the feeder, a latched-in-position lockout relay for effecting operation of the switch to connect the capacitor to the circuit, said relay having a reset winding for returning the relay to its initial position for effecting said operation of the switch, a voltage relay responsive to the voltage on the load side of the regulator for controlling the regulator, another voltage relay responsive to the voltage on the source side of the regulator for effecting operation of the lockout relay and changing the voltage applied to the voltage relay on the load side of the regulator, trip means for said switch, circuit means including a contact of the lockout relay connecting said trip means and reset winding in parallel when the lockout relay is reset, time delay means for effecting energization of the reset winding in response to predetermined operation of the voltage relay on the source side, and fault means responsive to excessive temperature of the capacitor for effecting energization of the trip means independently of the reset winding.

No references cited.